United States Patent

[11] 3,580,289

| [72] | Inventors | Ralph E. James, Jr.<br>Wyomissing;<br>Robert B. Koch, Reading, Pa. |
|------|-----------|------|
| [21] | Appl. No. | 607,985 |
| [22] | Filed | Jan. 9, 1967 |
| [45] | Patented | May 25, 1971 |
| [73] | Assignee | The Polymer Corporation |

[54] FLEXIBLE HOSE CONSTRUCTION
1 Claim, 9 Drawing Figs.

[52] U.S. Cl. .................................................. 138/121,
138/125, 138/127, 138/123
[51] Int. Cl. ...................................................... F16l 11/04,
F16l 11/18
[50] Field of Search.......................................... 138/121,
122, 123, 124, 125, 127; 156/56, 291, 294;
161/123, 133, 148

[56] References Cited
UNITED STATES PATENTS

| 2,367,643 | 1/1945 | Hendrie........................ | 138/129 |
| 2,901,024 | 8/1959 | Marsden....................... | 138/122X |
| 2,941,571 | 6/1960 | Rothermel.................... | 138/122X |
| 3,180,364 | 4/1965 | Ohlson ......................... | 138/122 |
| 3,221,774 | 12/1965 | Fritz et al...................... | 138/125 |
| 3,266,527 | 8/1966 | Ross............................. | 138/125 |

FOREIGN PATENTS

| 987,321 | 3/1965 | Great Britain................ | 138/122 |

*Primary Examiner*—Herbert F. Ross
*Attorney*—Synnestvedt and Lechner

ABSTRACT: Corrugated flexible hose structure including one or more of the following features: a compressible filler material in the grooves of the hose sidewall for controlling sidewall flexure; a high tenacity yarn in the grooves; a braided covering bonded only to the crests of the ridges between the grooves; methods for filling the grooves; and methods for applying and bonding the braided covering.

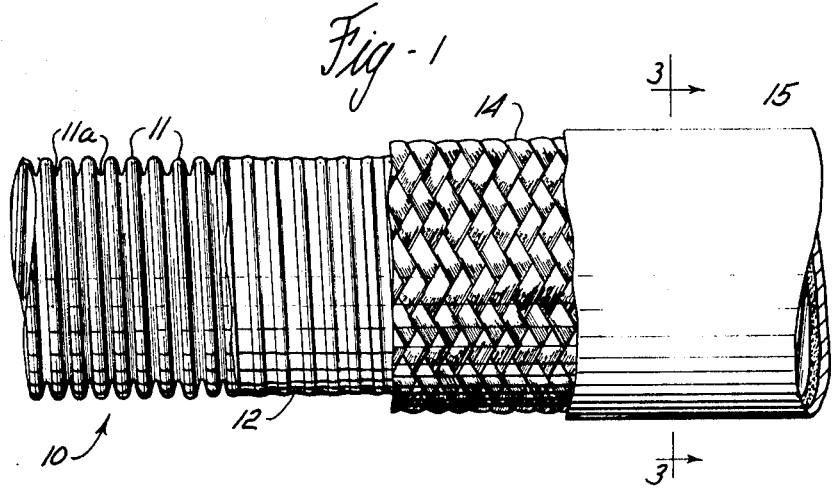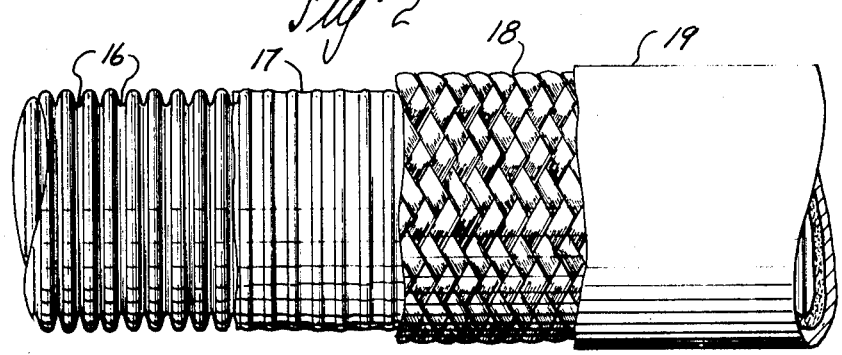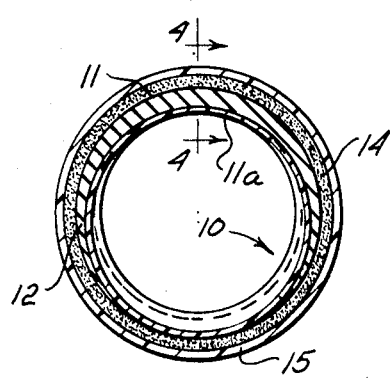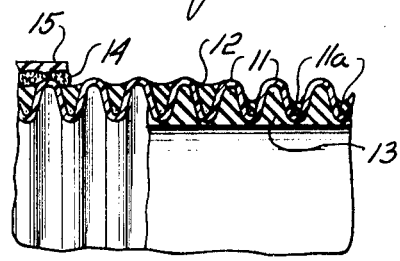
INVENTORS
RALPH E. JAMES
ROBERT B. KOCH
BY
Synnestvedt & Lechner
ATTORNEYS

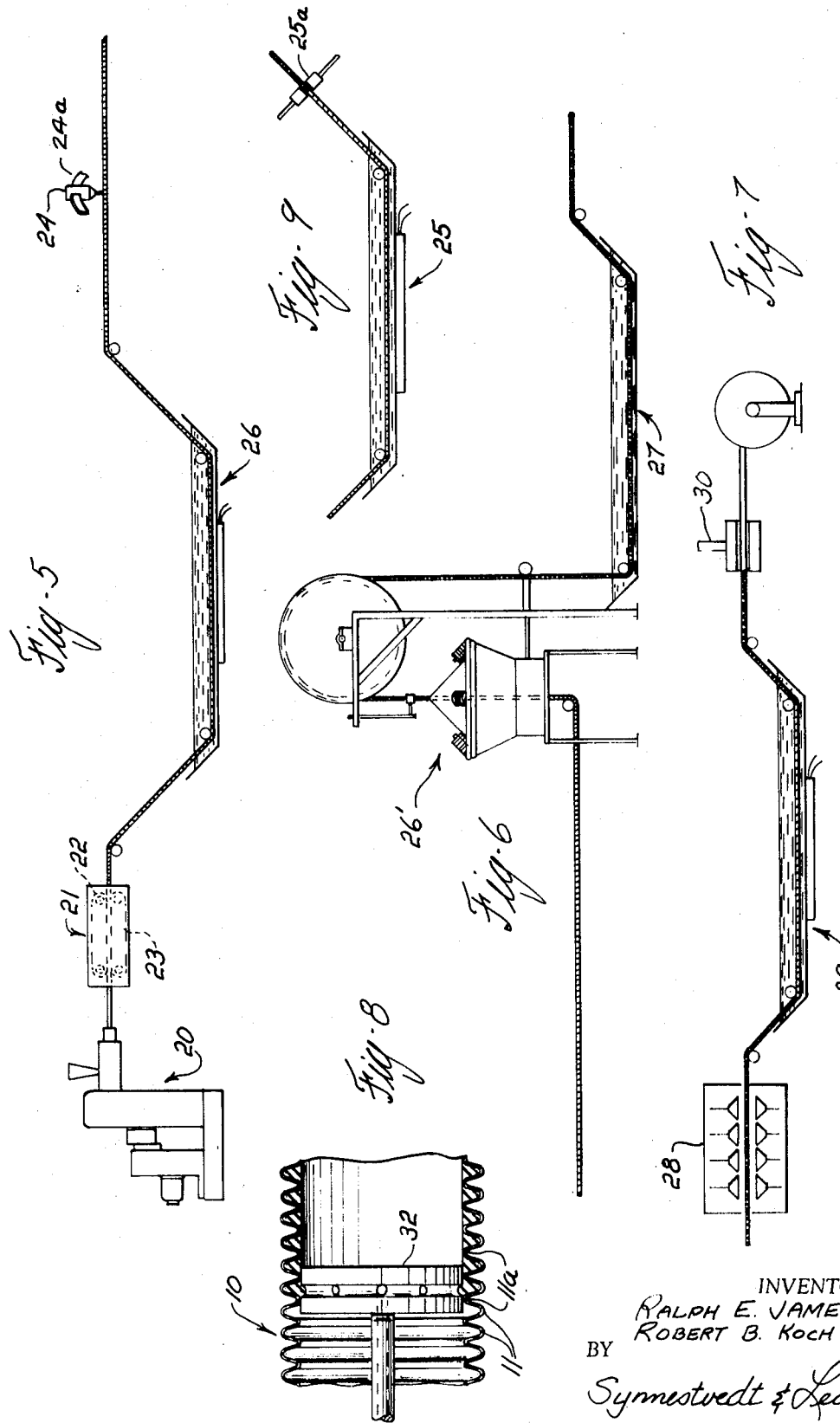

FLEXIBLE HOSE CONSTRUCTION

This invention relates to a novel form of flexible hose construction and to techniques for making same. More particularly, the invention is directed to improvements in corrugated hose made from plastic materials and to methods for making such hose.

Prior art flexible hoses of the type to which the invention generally relates are made largely from plastics such as nylons or other polymeric materials and are sometimes covered with a woven sheath. Particularly effective examples of sheath types of hose are described in U.S. Pat. No. 2,977,839 and No. 3,251,381, of Robert B. Koch. The hoses described in these patents are especially useful for handling fluids under high pressure and are comprised of a nylon inner tubular core covered with a sheath of braided textile material made from nylon or a polyester such as Dacron (terephthalic acid and ethylene glycol). In the construction described in U.S. Pat. No. 3,251,381, the textile braid is covered with a thin outer covering of flexible polymeric material.

The use of hoses made from these polymeric materials has become widespread in industry for applications requiring the unusual qualities of chemical resistance, high strength, resistance to abrasion, and the many other valuable characteristics which these materials possess.

It has been recognized that the provision of corrugations or transverse grooves in the wall section of a tubular member offers significant advantages. Including among the advantages are exceptional flexibility, crush resistance, and resistance to collapse when the member is used as a suction tube. In view of these advantages, corrugated unsheathed tubes have been in use to some extent. However, such use has been limited to situations where the tubes are not subjected to particularly high pressures or to frequently repeated stressing.

This is due to the fact that when such a tube is stressed, as when it is subjected to substantial internal pressure, the low points of each of the grooves between the convolutions are forced radially outwardly. Such distortion produces tensile and flexural stresses in the sidewalls of the corrugations. Although the plastic materials from which these tubes can be made are resistant to ordinary flexural fatigue, repeated extreme flexure will result in eventual failure, If, for example, the internal pressure is sufficient to collapse or flatten the corrugations, the tube will rupture in a relatively short time. Even something less than complete collapse of the corrugations will drastically shorten the life of the tube so made.

The present invention provides a generally thin-walled hose having a corrugated or transversely grooved cross section which is provided with means for eliminating, for all practical purposes, the aforementioned problem of failure generally characteristic of prior art corrugated tubing.

Accordingly, an important object of the invention is the provision of an improved flexible corrugated hose which is especially effective for high pressure applications.

Another object of the invention is the provision of a plastic corrugated hose useful for high-pressure applications and which is particularly resistant to crushing and collapse.

Another object of the invention is the provision of a hose which is capable of a high volumetric expansion, thereby enabling it to absorb pressure pulses developed by intermittently operating compressors and hydraulic equipment.

Still another important object of the invention lies in the provision of methods for making a hose having the aforementioned qualities.

The foregoing and other objects of the invention will become clear upon reference to the following detailed description when taken with reference to the accompanying drawings in which:

FIG. 1 is an elevational view, with certain portions of the structure broken away for clarity of illustration, showing one form of hose constructed in accordance with the principles of our invention having corrugations helically arranged;

FIG. 2 is a similar elevational view of a second form of our invention having circular corrugations;

FIG. 3 is a right sectional view taken along line 3-3 of FIG. 1;

FIG. 4 is a fragmentary view on a slightly enlarged scale taken along line 4-4 of FIG. 3, different portions of the grooves being filled with different amounts of filler material for illustration purposes;

FIGS. 5 through 7 illustrate various steps in a process for making the hose embodying our invention;

FIG. 8 is a view of apparatus used for carrying out one step of our inventive process; and FIG. 9 illustrates a technique alternative to that shown in FIGS. 5 through 7.

An important aspect of our invention lies in the discovery that failures in corrugated tube due to the tensile and flexural stress which cause the polymeric material to fatigue under repeated or prolonged flexing can be substantially eliminated by filling part or all of the free space between adjacent crests of the corrugations with a material which limits the deformation caused by substantial internal pressure. For most purposes, elastomeric materials are preferred, although it should be understood that certain important objects of the invention can be achieved when other filler materials are used in whole or in part. The elastomeric material may be a natural or synthetic rubber or a wide variety of other materials including closed cell foams. Moreover, the elastomeric material may fill either part or all of the space between the corrugations depending upon the amount of volumetric expansion which is desired in the hose. In either case, such material not only resists the movement of the sidewalls but urges the flexed wall portions back to their original position following each flexure.

It has been found that such a construction possesses the flexibility and resistance to collapse inherent in unfilled corrugated tubes and as will be brought out below, it has been observed that such a construction at least doubles the life of the tube as compared with the structure in which the free spaces between the corrugations are not filled.

The corrugated shape of the hose may be achieved by molding or forming one or more helically extending ridges or lands and grooves, or by forming separate spaced apart, circular and ringlike ridges or lands which are arranged in planes perpendicular to the tube axis and which are spaced apart by ringlike grooves.

With reference to the helically extending ridges and grooves, in the specification and claims hereinafter, each coil or turn of a helically extending groove or ridge will be considered to be a single groove or ridge respectively.

Generally, maximum flexibility and resistance to collapse dictates that if a helical configuration is used, the helix angle should be relatively small. Although the angle is not particularly critical, a tube in which the convolutions are formed at a helix angle of about 3½° will perform quite satisfactorily. The corrugations may be formed on the inner or outer surface of the sidewall alone while maintaining the other surface as a smooth walled surface, although we prefer a structure having both inner and outer corrugations, as shown in the drawings and described below, in view of the maximum flexibility imparted by such a configuration and also because it provides maximum economy of material and is well suited for fabrication by the techniques described herein.

Another important aspect of our invention lies in the provision of a braided textile covering for a corrugated inner tubular member. According to the invention, the braided covering is bonded to the tops or crests of the convolutions only, thereby preserving the flexibility of the inner tubular member while giving the structure the added burst strength provided by the braided covering.

Attention is now directed to FIG. 1 which shows one preferred form of hose formed in accordance with the teachings of the present invention. The hose shown in FIG. 1, includes an inner tubular core member 10. The inner tubular member 10 may be made of a variety of polymeric materials, the choice of materials depending somewhat on the use to which the hose will be put. Typical materials include various nylons, especially polyhexamethyleneadipamide (nylon 6/6) or polycaprolactam (nylon 6), polyvinylchlorides, polyethylene, polypropylene or fluoroplastics. For most purposes, however, we prefer to fabricate the tubular core member from polyhexamethyleneadipamide (nylon 6/6), polycaprolactam (nylon 6) or various copolyamides. These materials are strong, tough, have high impact strength and resistance to abrasion and have excellent chemical resistance including resistance to various hydrocarbons, alkalies and most salt solutions. Of these two materials, polycaprolactam has higher resistance to fatigue from flexure, although both materials produce excellent results. Tubes formed from either of these nylons have excellent resistance to nonflammable hydraulic fluids, especially those of the phosphate type and thus are preferred for hydraulic lines as well as for conduits for handling a wide variety of other fluids, including gasoline or hydrocarbon lubricants.

The inner tubular member 10 shown in FIG. 1 is provided with spirally or helically extending convolutions 11 having a helix angle of about 3½°. Both the inner and outer surfaces of the tube wall are preferably corrugated as viewed in section in FIG. 4.

According to the invention, an elastomeric material 12 fills the grooves 11a which run between the ridges 11. As shown in FIG. 1, the elastomeric material substantially fills the grooves although the amount of desired flexibility will vary with the application for which the hose is intended, and for this purpose, the amount of elastomeric material within the grooves may be varied somewhat. A few simple flexure tests will readily determine the amount required.

So far as we have been able to determine, any elastomeric material may be used as a filler for the grooves between the ridges. Typical materials include flexible urethanes, natural and synthetic rubber, polysulfides, silicone rubber, flexible nylons, flexible polyvinylchlorides, chlorinated polyethylene and polyvinylbutyral. An excellent material for the purpose is silicone rubber sold under the trademark "SILASTIC RTV" by the Dow-Corning Company. This material vulcanizes at room temperature and can be wrapped within the groove 11a as a continuous bead or strip in a relatively viscous state.

No special precautions need be taken to achieve a bond between the elastomer and the walls of the grooves. So long as sufficient elastomer is inserted into the groove so that it fills each groove to the desired level and bears against the groove sidewalls, it will offer resistance to the deflection of the tubing and other objects of the invention will be served. As a rough rule of thumb, for best results, the grooves should be at least half filled and possibly more depending upon the resiliency of the elastomer and the contemplated use of the tube.

In certain instances, when the corrugated cross section shown in FIGS. 1 and 2 is employed, it may also be desirable to fill the internal grooves in the tubular core. A tube having the inner grooves filled has the advantage of presenting a smooth inner wall section to the fluid being handled, thereby minimizing frothing and turbulence within the line which may be objectionable in hydraulic systems. For illustrative purposes, portions of the inner grooves of the tubular core are filled with an elastomer as shown at 13 in FIG. 4.

The same materials used to fill the outer grooves may also be employed for the inner grooves, bearing in mind that the material selected should be chemically resistant to the fluid being conveyed. When a nylon inner tubular member is employed, the inner grooves can be filled with a flexible polyamide, for example, a flexible copolyamide sold by DuPont under the trademark "ZYTEL," catalog number FE-2421.

Under certain other circumstances, as where less volumetric expansion is required, the filler material may be the same as that used in the manufacture of the tubular core member.

In order to increase the burst strength of the filled tubing, it is preferably covered with a braided textile material as shown at 14 in FIG. 1. Preferably, the braided covering is made of nylon, Dacron (terephthalic acid and ethylene glycol) or a blend of these two materials. A suitable braided covering is disclosed in the aforesaid Koch U.S. Pat. No. 2,977,839. The braided covering should be bonded to the filled inner tubular member by means of a suitable bonding or plasticizing agent.

In order to impart maximum flexibility to the product, the bond is preferably formed between the braid and the crests of the ridges. In addition, we prefer to bond only the layers of the fibers closest to the surface of the tubular core. We have found that when the tubular core is covered with a braid which is bonded only to the crests of the convolutions and when the bond is limited to the layers of the fibers closest to the tubular core, excellent flexibility is maintained. When the hose is so formed, the portion of the braid between convolutions is free to move when flexure occurs. In addition, the outer layers of the braid are free to slip with respect to the inner layers and with respect to the inner tubular core as a whole.

Although the hose so far described will be quite satisfactory for many purposes, we prefer to cover the braid with a relatively smooth, thin, flexible outer sheath of nylon, polyurethane or other material 15 in order to present a relatively smooth surface which can be readily cleaned and to protect the braid from abrasion and chafing. Although other materials are suitable for the purpose, nylon produces excellent results. The nylon is preferably bonded to the outer layers of the braid by means of a solvent bath which plasticizes the outer layers of the braid and the inner surface of the covering.

Reference is now made to the embodiment of the invention disclosed in FIG. 2. The hose of FIG. 2 is substantially identical to that shown in FIG. 1, except that the corrugations do not extend helically but are formed as a multiplicity of individual, ringlike, alternate ridges and valleys which are preferably, although not necessarily, oriented in planes perpendicular to the longitudinal axis of the hose. The ridges are separated by circumferentially extending grooves 16. As is the case with the hose described in FIG. 1, the outer grooves 16 are filled with an elastomeric material 17. If required in order to reduce turbulence in the fluid flowing through the tube, the inner grooves may also be filled.

A braided covering 18 is bonded to the outer surface of the tubular core member and a thin flexible outer covering of nylon or like material 19 covers and is bonded to the braid.

In the manufacture of hose of the type disclosed above, the tubular core member may be continually extruded from an extruder 20 of the general type disclosed, for example, in U.S. Pat. No. 2,747,224. As the nylon core comes out of the extruder, the material is in a relatively soft workable state and the surface is molded by passing the material into a mold diagrammatically illustrated at 21 in FIG. 5. Mold 21 is typically provided with travelling mold members 22 and 23 which have corrugated molding surfaces into which the tube is pressed by gas pressure supplied interiorly of the tube to produce the desired corrugated effect. The mold corrugations are either helically arranged ridges, or separate and individual ridges extending generally transverse to the length of the hose depending upon the type of hose being made.

Following the corrugating or molding operation and before the braided covering is applied, the spaces between the corrugations in the tubing are filled with an elastomeric material. In the case of a helically corrugated tube, the filler, typically silicone rubber with a room temperature vulcanizer, is forced out of a nozzle 24 and wrapped into the groove between the convolutions in continuous fashion. For this purpose, the nozzle may be mounted on a yoke 24a which rotates about the tubular core in timed relation to its speed of advance.

If the corrugations are formed as separate circumferential ridges, a series of rings of the elastomer in a relatively viscous state, having the room temperature vulcanizer, can be applied, or alternatively, the tubular core can be passed through a viscous bath 25 of the curable elastomeric material after which the excess is removed by a scraper die 25a as is shown in FIG. 9. Other alternatives which will produce satisfactory results include passing the tubular core through a crosshead extruder where a melt extrusion of the material is applied or fitting ringlike elastic bands in a solid state into the grooves.

Before the braided covering is applied, a bonding agent is applied to the outer surface of the tubular core. Although a purely mechanical bond would be satisfactory, we prefer to chemically fuse the cover to the tubular core and for this purpose, a bath of a suitable plasticizer is prepared. For nylon, the plasticizer may be an aromatic hydroxy compound or may be selected from the lower fatty acids such as acetic or formic acid. A preferred plasticizer is an aqueous solution of resorcinol which is an aromatic hydroxy compound.

For best results, the resorcinol should have a specific gravity ranging between 1.045 and 1.051 at a temperature of about 150° F. The evaporation of water will increase the specific gravity of the bath and means such as a metallic covering should be provided in order to retard the evaporation.

We have found that excellent results are obtained when the plasticizer is maintained at a temperature of between 140° F. to 160° F. for polyhexamethyleneadipamide tubes. For polycaprolactam, it is better to use a somewhat higher temperature, say somewhere in the neighborhood of 180° F. Typically, the resorcinol is applied to the surface of the tubular core by immersing it in a bath of the solution, although it is also contemplated that the solution be wiped or brushed onto the surface.

When the helically convoluted tubular core is treated with plasticizer, it is convenient to first immerse the core in a bath of resorcinol shown at 26 after which the spiral bead of silicone rubber is applied. With this arrangement, only the plasticized crests of the convolutions will be exposed to the braided covering.

Following treatment with the resorcinol bath and after the grooves have been filled the tubular core passes directly into a suitable braiding machine 26 which applies the braided cover. A variety of standard braiding machines may be used for the purpose.

With respect to the application of the bonding agent, it may be desirable to alter the sequence of operating steps somewhat depending upon the type of tubing being treated and the manner in which the filler is applied. If the filler is applied in a semisolid state, the resorcinol can ordinarily be applied prior to the filling of the grooves, leaving only the plasticized crests of the convolutions exposed for the contact with the braid. If the filler is applied by passing the tubular member through a tank of uncured elastomer, it will, of course, be impractical to first apply the plasticizer. In that case, the resorcinol may be wiped onto the crests or the filled tubing may be passed through a bath of resorcinol. Preferably, the procedure should be followed which results in a bond to the crests only.

After the braiding operation, the hose may be passed into a curing tank containing a bath of hot water to remove excess plasticizing agent from the braid and to increase the plasticizing effect of the resorcinol. If used, the bath should be maintained at a temperature somewhere between 150° F. and 212° F. A temperature of 160° F. has been found to yield excellent results.

Following braiding and curing, the outer protective coating is applied. For this purpose, the braided tubing should first be heated by heater 28 as described in Koch U.S. Pat. No. 3,251,381. It is then passed through a second resorcinol bath 29 and through a crosshead extruder 30 which applies the covering to the braid.

As pointed out in the aforementioned Koch U.S. Pat. No. 3,251,381, the second resorcinol bath should be heated to a temperature of about 200° F. when a type-6 nylon is being applied. For type 6/6 nylon, the resorcinol solution should be maintained at a somewhat lower temperature, since this nylon is more readily plasticized.

For certain applications, it will be desirable to provide a hose which has a more limited capacity for volumetric expansion, but which still retains the ability to flex when bent or twisted axially. In order to accomplish this, a high-tenacity yarn, preferably made of nylon can be embedded in the grooves between the corrugations.

In order to fill the internal grooves, a distributor head 32 shown in FIG. 8 may be mounted within the tubular member at a point immediately downstream from the point at which the corrugations are formed. The distributor is mounted on a hollow shaft which extends through the extruder nozzle. Molten elastomeric or plastic material is fed through the hollow shaft. The distributor head has a centrally located circumferential groove which communicates with the interior of the shaft by means of radially connecting passages. Molten elastomer or other plastic material is formed through the hollow shaft and out through the radial passages to circumferential grooves. The flat portions on either side of the circumferential groove on the distributor head are wide enough so that an effective seal is maintained between the head and each side of the groove which is being filled. In this way, the groove filling material can be forced into the grooves to the minimum inside diameter of the tube.

In case the same polymer used for the tubular core is used as a filler for the inner grooves, similar filling techniques are followed. It should be noted, however, that when the same materials are used, a single pumping system can be used for the tubular core and filler extruders.

The invention has application to the manufacture of hose made from a wide variety of polymeric materials. While for most purposes nylon is a most effective material for the tubular member, there are certain applications in which it may be more desirable to employ other materials. This is true in the case of hoses designed for handling steam since water vapor causes nylon to hydrolize. In such case, the tubular core can be made from polypropylene, polysulfone, polyphenylene oxide or some other material which does not have this tendency.

Because the amount of volumetric expansion can be varied in accordance with the type and amount of filler provided, it is possible to engineer the performance characteristics of a hose to a degree which is not possible when the filler is not provided.

Further limiting of the volumetric expansion may also be accomplished by wrapping a high-tenacity nylon or Dacron yarn in the exterior grooves. Preferably, the grooves are then filled with the filler material. The yarn is best applied to the spirally external grooves of the corrugated tubular member in continuous strand form.

As noted above, filled hoses formed according to the teachings of our invention have been found extremely durable. For example, a ⅝-inch inside diameter hose in which the inner tubing was made of nylon 6 and in which the grooves between convolutions were filled with Silastic RTV was found to complete 120,000 impulse cycles on a standard flex testing machine without failure of the hose and without any noticeable deterioration. In comparison, when an unfilled construction, in other respects identical to the filled construction, was tested, failure occurred at 60,000 cycles. It should be noted that braided rubber tubings fail at somewhat under 10,000 cycles when subjected to this test.

There appears to be no limit to the size of hose which can be formed in accordance with the teachings of our invention other than practical considerations such as the size of available machinery necessary to handle the material.

I claim:

1. A flexible high-pressure hose comprised of:
    an impervious corrugated tube adapted for the transmission of fluids, said corrugations being characterized by alternating ridges and grooves extending generally circumferentially of said tube, each of said corrugations having sidewall portions defined as the portion of the tube separating adjacent ridges from the low point of the corresponding groove;
    a braided cover of high-tensile strength yarn fixedly attached to the outermost portion of said ridges, said braided cover being adapted to restrain radial expansion of the outer surface of the hose so as to increase the burst strength thereof; and
    a resilient material, filling at least a substantial portion of the space defined between the corrugations and the braided cover such that when the hose is subjected to substantial internal pressures, or otherwise stressed, the sidewall portions thereof deform, thus compressing the resilient material which in turn resists further deformation of the sidewall portions of the tube and assists in restoring the sidewall portions thereof to their original configuration.

UNITED STATES PATENT OFFICE
CERTIFICATE OF CORRECTION

Patent No. 3,580,289        Dated May 25, 1971

Inventor(s) Ralph E. James, Jr. and Robert B. Koch

It is certified that error appears in the above-identified patent and that said Letters Patent are hereby corrected as shown below:

Col. 6, line 6, "formed" should read --forced--;

Col. 6, line 58, "I claim" should read --We claim--.

Signed and sealed this 25th day of April 1972.

(SEAL)
Attest:

EDWARD M. FLETCHER, JR.
Attesting Officer

ROBERT GOTTSCHALK
Commissioner of Patents